United States Patent [19]
Janesch et al.

[11] Patent Number: 6,091,342
[45] Date of Patent: Jul. 18, 2000

[54] TRANSPONDER COMMUNICATION DEVICE FOR THE CONTACTLESS COMMUNICATION WITH AT LEAST ONE TRANSPONDER, AND TRANSPONDER FOR THE CONTACTLESS COMMUNICATION WITH AT LEAST ONE TRANSPONDER COMMUNICATION DEVICE

[75] Inventors: Werner Janesch, Voitsberg; Wilfried Petschenig, Graz; Kuno Reis, Frohnleiten; Bernhard Spiess, Graz, all of Austria

[73] Assignee: U.S. Philips Corporation, New York, N.Y.

[21] Appl. No.: 09/009,749

[22] Filed: Jan. 20, 1998

[30] Foreign Application Priority Data

Jan. 21, 1997 [EP] European Pat. Off. .............. 97890013

[51] Int. Cl.[7] ........................... G08C 19/00; B60R 25/10; G01S 13/74
[52] U.S. Cl. ............................... 340/825.54; 340/825.69; 340/825.72; 340/426; 342/42; 342/44; 342/51
[58] Field of Search ........................ 340/825.54, 825.69, 340/825.72, 426; 342/42, 44, 51; 70/256; 380/287; 307/10.5; 361/172

[56] References Cited

U.S. PATENT DOCUMENTS

| | | |
|---|---|---|
| 5,345,231 | 9/1994 | Koo et al. . |
| 5,425,032 | 6/1995 | Shloss et al. ........................ 370/95.2 |
| 5,430,447 | 7/1995 | Meier ........................................ 342/51 |
| 5,491,484 | 2/1996 | Schuermann .............................. 342/51 |
| 5,699,066 | 12/1997 | Marsh et al. .............................. 342/44 |
| 5,724,030 | 3/1998 | Urbas et al. ........................ 340/870.17 |
| 5,745,049 | 4/1998 | Akiyama et al. .................. 340/870.17 |
| 5,822,683 | 10/1998 | Paschen ..................................... 455/66 |
| 5,926,110 | 7/1999 | Downs et al. ....................... 340/825.54 |

*Primary Examiner*—Michael Horabik
*Assistant Examiner*—M. Phan

[57] ABSTRACT

A transponder communication device has an interrogation signal generator for generating an interrogation signal, a transmitter for transmitting the interrogation signal to a number of transponders, and a receiver for receiving answers signal from transponders. A transponder has an interrogation signal detector, an answer signal generator, and a state setting controller for setting a state of the transponder. The transponder communication device selects a single transponder from the number of transponders. First, the transponder communication device transmits an initial interrogation signal is transmitted to all transponders when the transponders are in an active state. In dependence of answer signals received from the transponders, the transponder communication device transmits a standby setting signal to at least one transponder at a time to instruct the transponders to adopt a standby state. In the standby state the transponders wait until a single other transponders has been selected. Thereafter all unselected transponders are selected by first setting the unselected transponders into an active state, from the standby state. Selected transponders are set into a passive state until all transponders have been selected. Thereupon, the active state is restored for all transponders.

17 Claims, 3 Drawing Sheets

TRANSPONDER COMMUNICATION DEVICE FOR THE CONTACTLESS COMMUNICATION WITH AT LEAST ONE TRANSPONDER, AND TRANSPONDER FOR THE CONTACTLESS COMMUNICATION WITH AT LEAST ONE TRANSPONDER COMMUNICATION DEVICE

BACKGROUND OF THE INVENTION

Transponder communication device for the contactless communication with at least one transponder, and transponder for the contactless communication with at least one transponder communication device.

The invention relates to a transponder communication device adapted to provide contactless communication with at least one transponder, including interrogation means for generating at least one item of interrogation information by means of which a transponder present within a receiving range of the transponder communication device and which is in an active state can be interrogated to generate and transmit answer information, and transmission means for transmitting the at least one item of interrogation information to a transponder present within the receiving range, and receiving means for receiving answer information generated and transmitted by a transponder present within the receiving range in response to the at least one item of interrogation information, and deactivation means for generating at least one item of deactivation information by means of which a transponder present within the receiving range and which is in its active state can be set to a state in which the transponder does not generate and transmit answer information in response to the at least one item of interrogation information.

The invention further relates to a transponder which is adapted to provide contactless communication with at least one transponder communication device and which, in an active state, is activated to communicate with a transponder communication device, including receiving means for receiving at least one item of interrogation information transmitted by a transponder communication device, and interrogation detection means for detecting at least one item of received interrogation information, and answer means adapted to be controlled by the interrogation detection means to generate answer information in response to received interrogation information detected by the interrogation detection means, and transmission means for transmitting the answer information generated by the answer means, and deactivation means by means of which the transponder can be set to a state in which the transponder does not generate and transmit answer information in response to interrogation information.

A transponder communication device of the type defined in the first paragraph and a transponder of the type defined in the second paragraph are commercially available and are consequently known. For such a known transponder communication device as well as for such a known transponder reference can be made, for example, to the document U.S. Pat. No. 5,345,231 A.

With regard to a known transponder communication device and to a known transponder the afore-mentioned document U.S. Pat. No. 5,345,231 A expounds that in the case that a plurality of known transponders are present within the receiving range of a known transponder communication device the problem of the individual selection of each of the individual known transponders arises. This individual selection can be effected with the aid of selection means of a known transponder communication device, which for this purpose include interrogation means capable of generating and transmitting at least one item of interrogation information and by means of which each of the transponders present within the receiving range of a known transponder communication device can be requested successively to generate and transmit answer information to the known transponder communication device. In the known transponder communication device the presence of a plurality of transponders which are each in an active state is detected by means of a presence protocol, the transponder communication device starting an interrogation, after detection of a plurality of transponders present within the receiving range of the transponder communication device, whether one transponder among one half of the total number of transponders is present within the receiving range of the transponder communication device. This is effected in that the transponder communication device transmits an interrogation protocol. If one or more transponders of the interrogated half of the total number of transponders are present within the receiving range of the transponder communication device, these transponders, which are each in the active state, respond by transmitting their individual codes and some test bits to the transponder communication device. Each individual code then forms answer information which is generated in the relevant transponder and is transmitted by the relevant transponder. If a transponder responds, the transponder thus has already been selected. However, if several transponders respond, this will result in a superposition of answer information, which in conjunction with the test bits is detected in the transponder communication device. Subsequently, the transponder communication device starts a further interrogation, said half of the total number of transponders being halved again. This process is repeated until only one transponder responds. If no transponder responds to an interrogation, the process proceeds with the division of the complementary transponder group. When a transponder has been selected, its re-selection during a subsequent selection process is inhibited in that deactivation means provided in the transponder communication device generate deactivation information by means of which, after its selection, a transponder present within the receiving range can be set from its active state into a state in which it does not generate and transmit any answer information in response to interrogation information, thus assuring that a transponder already selected can be re-selected only after all the other transponders present within the receiving range of the transponder communication device have been selected.

In a known transponder communication device and a known transponder it is assumed that each transponder is in its active state when it enters the receiving range of the transponder communication device and that it remains in its active state until the transponder is selected, after which the transponder is set to a state in which it cannot supply answer information in response to interrogation information. Particularly when a comparatively large number of transponders are present within the receiving range of the transponder communication device, the fact that the transponders are in their active states prior to their selection may give rise to disturbances in the communication with the transponder communication device, which is unfavorable and undesirable. In the case of active transponders having an integrated power source for their power supply, the fact that a transponder is in its active state in which, however, the transponder is not or need not be active at all for a comparatively long time gives rise to an unnecessary power consumption, which is also unfavorable and undesirable.

SUMMARY OF THE INVENTION

It is an object of the invention to eliminate the aforementioned problems in a transponder communication device of the type defined in the first paragraph and in a transponder of the type defined in the second paragraph, and to provide an improved transponder communication device and an improved transponder by means of which always an undisturbed and trouble-free communication can be obtained and by means of which the operating mode of a transponder can be adapted to different communication tasks in a simple and reliable manner.

According to the invention, in order to achieve the aforementioned objects, a transponder communication device of the type defined in the first paragraph is characterized in that the deactivation means include a deactivation stage adapted to generate deactivation information by means of which a transponder present within the receiving range, which transponder has already transmitted answer information in response to interrogation information in its active state, can subsequently be set from its active state to a passive state, and the deactivation means include a further deactivation stage adapted to generate at least one item of further deactivation information by means of which a transponder present within the receiving range, which transponder has already transmitted answer information in response to interrogation information in its active state, can subsequently be set from its active state to a standby state, and the interrogation means include an interrogation stage adapted to generate interrogation information by means of which a transponder present within the receiving range can be set from its passive state to its active state and, in addition, can be interrogated, when necessary, to again generate and transmit answer information, and the interrogation means include a further interrogation stage adapted to generate further interrogation information by means of which a transponder present within the receiving range can be set from its standby state to its active state and, in addition, can be interrogated to again generate and transmit answer information, and the interrogation means include a still further interrogation stage adapted to generate at least one item of further interrogation information by means of which a transponder present within the receiving range, which transponder has already transmitted answer information in response to interrogation information in its active state, can be interrogated to again generate and transmit answer information without leaving the active state.

With the aid of the means according to the invention it is achieved in a simple manner that by means of a transponder communication device a plurality of control information items can be generated and transmitted to each of the transponders present within the receiving range of the transponder communication device in order to enable each transponder to be set in a simple manner to different operating modes which correspond to different tasks in the communication between the transponder communication device and any one of the transponders present within its receiving range. The possibility of setting a transponder to its standby state has the advantage that, for example during a selection process in which an individual transponder is to be singled out from a multitude of transponders by means of the transponder communication device, all the transponders not needed in such a selection process can be set to their standby states and, consequently, cannot adversely affect the selection process. Such a standby state of a transponder further has the advantage that, if applicable, a distinctly reduced power consumption of the transponder is obtained in its standby state as compared with its active state.

In a transponder communication device in accordance with the invention it has proved to be advantageous if there have been provided evaluation means which cooperate with the receiving means, which evaluation means include detection means adapted to generate and supply at least one item of detection information depending on the occurrence of at least one received item of answer information transmitted by a transponder, and the further deactivation stage of the deactivation means can be activated, depending on the occurrence of detection information, to generate at least one item of further deactivation information. In this way, a trouble-free and simple generation of further deactivation information is achieved.

In a transponder communication device in accordance with the invention it has proved to be advantageous if there have been provided evaluation means which cooperate with the receiving means, which evaluation means include detection means adapted to generate and supply at least one item of detection information depending on the occurrence of at least one received item of answer information transmitted by a transponder, and the still further information stage of the information means can be activated, depending on the occurrence of detection information, to generate at least one item of still further interrogation information. In this way, a trouble-free and simple generation of still further interrogation information is achieved.

In transponder communication device in accordance with the invention as defined in the two preceding paragraphs, it has proved to be advantageous if selection means cooperate with the evaluation means, and detection information supplied by the evaluation means can be applied to the selection means, and the further deactivation stage can be activated by the selection means, in conformity with detection information applied to said selection means, to generate at least one item of further deactivation information. With the aid of the selection means it is thus simply possible to select which further deactivation information is to be generated.

In an embodiment of a transponder communication device as defined on the preceding paragraph it has proved to be very advantageous if selection means cooperate with the evaluation means, and detection information supplied by the evaluation means can be applied to the selection means, and the still further interrogation stage can be activated by the selection means, in conformity with detection information applied to said selection means, to generate still further interrogation information. With the aid of the selection means it is thus simply possible to select which further interrogation information is to be generated.

In a transponder communication device in accordance with the invention including evaluation means it has further proved to be advantageous if the evaluation means cooperate with further means adapted to generate first control information in dependence upon the occurrence of received answer information transmitted by only one transponder, and the first control information generated by the further means can be applied to the deactivation stage to generate the deactivation information. As a result, the further means enable the generation of deactivation information to be adapted simply to different situations.

In a transponder communication device in accordance with the invention as defined in the preceding paragraph it has proved to be advantageous if further means are further adapted to generate second control information in dependence upon the occurrence of received answer information transmitted by only one transponder, and the second control information generated by the further means can be applied to the further interrogation stage of the interrogation means to activate the generation of the further interrogation information. As a result, the further means enable the generation of the further interrogation information to be adapted simply to different situations.

In an embodiment of a transponder communication device in accordance with the invention including further means as in the two embodiments defined in the two preceding paragraphs, it has further proved to be very advantageous if the further means are constituted by data communication means with the aid of which, in dependence upon the occurrence of received answer information transmitted by only one transponder, data communication with data communication means of this transponder can be effected and with the aid of which control information can be generated and supplied upon termination of such a data communication. Thus, the data communication means, which are present at any rate, are also utilized for the generation of at least one item of control information.

In a transponder communication device in accordance with the invention having evaluation means including detection means, it has proved to be very advantageous if the detection means are adapted to detect an operational situation in which the receiving means have not received any answer information transmitted by a transponder, and the detection means are adapted to generate and supply further detection information upon detection of this operational situation, and the interrogation stage can be activated to generate the interrogation information in dependence upon the occurrence of the further detection information. Thus, it is achieved in a simple manner that in the case that no answer information has been received the answer interrogation information is generated again automatically.

In a transponder communication device in accordance with the invention as defined in the preceding paragraph it has further proved to be very advantageous if activation means are interposed between the detection means and the interrogation stage of the interrogation means, and the further detection information supplied by the detection means can be applied to the activation means, and the activation means can activate the interrogation stage to generate the interrogation information in conformity with the further information applied to said activation means. With the aid of the activation means the interrogation stage can be activated simply in dependence upon different activation criteria.

In all the transponder communication devices in accordance with the invention defined hereinbefore, it has proved to be advantageous if there have been provided means with the aid of which an individual transponder can be selected from a multitude of transponders. Thus, an individual selection of transponders in accordance with the invention by means of a transponder communication device in accordance with the invention can be effected in a simple and reliable manner.

According to the invention, in order to achieve the aforementioned objects, a transponder of the type defined in the second paragraph is characterized in that the deactivation detection means include a deactivation detection stage adapted to detect deactivation information transmitted by a transponder communication device, by means of which the transponder, which in its active state has already transmitted answer information in response to interrogation information, can subsequently be set from its active state to a passive state, and the deactivation detection means include a further deactivation detection stage adapted to detect further deactivation information transmitted by a transponder communication device, by means of which the transponder, which in its active state has already transmitted answer information in response to interrogation information, can subsequently be set from its active state to a standby state, and the interrogation detection means include an interrogation detection stage adapted to detect interrogation information transmitted by a transponder communication device, by means of which the transponder can be set from its passive state to its active state and, in addition, can be interrogated to again generate and transmit answer information, if necessary, and the interrogation detection means include a further interrogation detection stage adapted to detect further interrogation information transmitted by a transponder communication device, by means of which the transponder can be set from its standby state to its active state and, in addition, can be interrogated to again generate and transmit answer information, and the interrogation detection means include a still further interrogation detection stage adapted to detect still further interrogation information transmitted by a transponder communication device, by means of which the transponder, which in its active state has already transmitted answer information in response to interrogation information, can be interrogated to again generate and transmit answer information without leaving the active state.

With the means according to the invention it is achieved in a simple manner that by means of a transponder in accordance with the invention a plurality of control information items can be processed, to enable the transponder to be set in a simple manner to different operating modes which correspond to different tasks in the communication between the transponder and a transponder communication device. With the aid of the means in accordance with the invention it is further advantageously achieved that a transponder in accordance with the invention can be set to an active state, from the active state to a passive state, from the active state to a standby state and, the other way around, from the passive state to the active state and from the standby state to the active state. The possibility of setting a transponder in accordance with the invention to its standby state has the advantage that, for example during a selection process in which an individual transponder is to be singled out from a multitude of transponders by means of the transponder communication device, all the transponders not needed in such a selection process can be set to their standby states and, consequently, cannot adversely affect the selection process. Such a standby state of a transponder further has the advantage that, if applicable, a distinctly reduced power consumption of the transponder is obtained in its standby state as compared with its active state.

In a transponder in accordance with the invention it has proved to be advantageous if the deactivation detection stage is adapted to generate and transmit passive state information after detection of deactivation information, and by means of the passive state information the transponder can be set from its active state to its passive state, and there has been provided a passive state memory in which the passive state information can be stored and by means of which the transponder can be held in its passive state. Thus, a transponder in accordance with the invention can be set from its active state to its passive state and can be held in its passive state in a simple and reliable manner.

In a transponder in accordance with the invention as defined in the preceding paragraph it has proved to be very advantageous if the passive state memory can be erased by means of the interrogation detection stage after detection of interrogation information. Thus, such a transponder can be set very simply from its passive state to its active state.

In a transponder in accordance with the invention including a further deactivation detection stage it has further proved to be very advantageous if the further deactivation detection stage cooperates with means for generating and transmitting passive state information, which means can be activated by the further deactivation detection stage and can set the transponder from its active state to its standby state, and there has been provided a passive state information memory in which the passive state information can be stored and by means of which the transponder can be held in its standby state. Thus, a transponder in accordance with the invention can be set from its active state to its standby state and can be held in its standby state in a very simple and reliable manner.

In a transponder in accordance with the invention including a further interrogation detection stage it has further proved to be very advantageous if the further deactivation detection stage is constituted by the still further interrogation detection stage, and the still further interrogation detection stage cooperates with means for generating and supplying standby state information, which last-mentioned means can activate the still further deactivation detection stage and with the aid of which the transponder can be set from its active state to its standby state, and there has been provided a standby state memory in which the standby state information can be stored and by means of which the transponder can be held in its standby state. Thus, it is achieved that the further interrogation detection stage can be utilized not only for interrogating a transponder to generate and transmit answer information but also to set a transponder to its standby state.

In transponders in accordance with the invention as defined in the two preceding paragraphs it has proved to be very advantageous if the standby state memory can be erased by means of the interrogation detection stage after detection of interrogation information and by means of the further interrogation detection stage after detection of further interrogation information. Thus, such a transponder can simply be reset from its standby state to its active state.

In all the transponders in accordance with the invention defined hereinbefore it has proved to be advantageous if there have been provided means with the aid of which, in conjunction with a transponder communication device, an individual transponder can be selected from a multitude of transponders.

The above-mentioned as well as further aspects of the invention will become apparent from the embodiments described hereinafter by way of examples and will be elucidated with reference to these embodiments.

BRIEF DESCRIPTION OF THE DRAWINGS

The invention will now be described in more detail with reference to some embodiments which are shown in the drawings but to which the invention is not limited.

FIG. 1 further illustrates how a transponder communication device in accordance with a second embodiment and a third embodiment of the invention can be constructed on the basis of the first embodiment of the transponder communication device in accordance with the invention.

FIG. 2 further illustrates how a transponder in accordance with a second embodiment and a third embodiment of the invention can be constructed on the basis of the first embodiment of the transponder in accordance with the invention.

DESCRIPTION OF THE PREFERRED EMBODIMENTS

Figure 1:
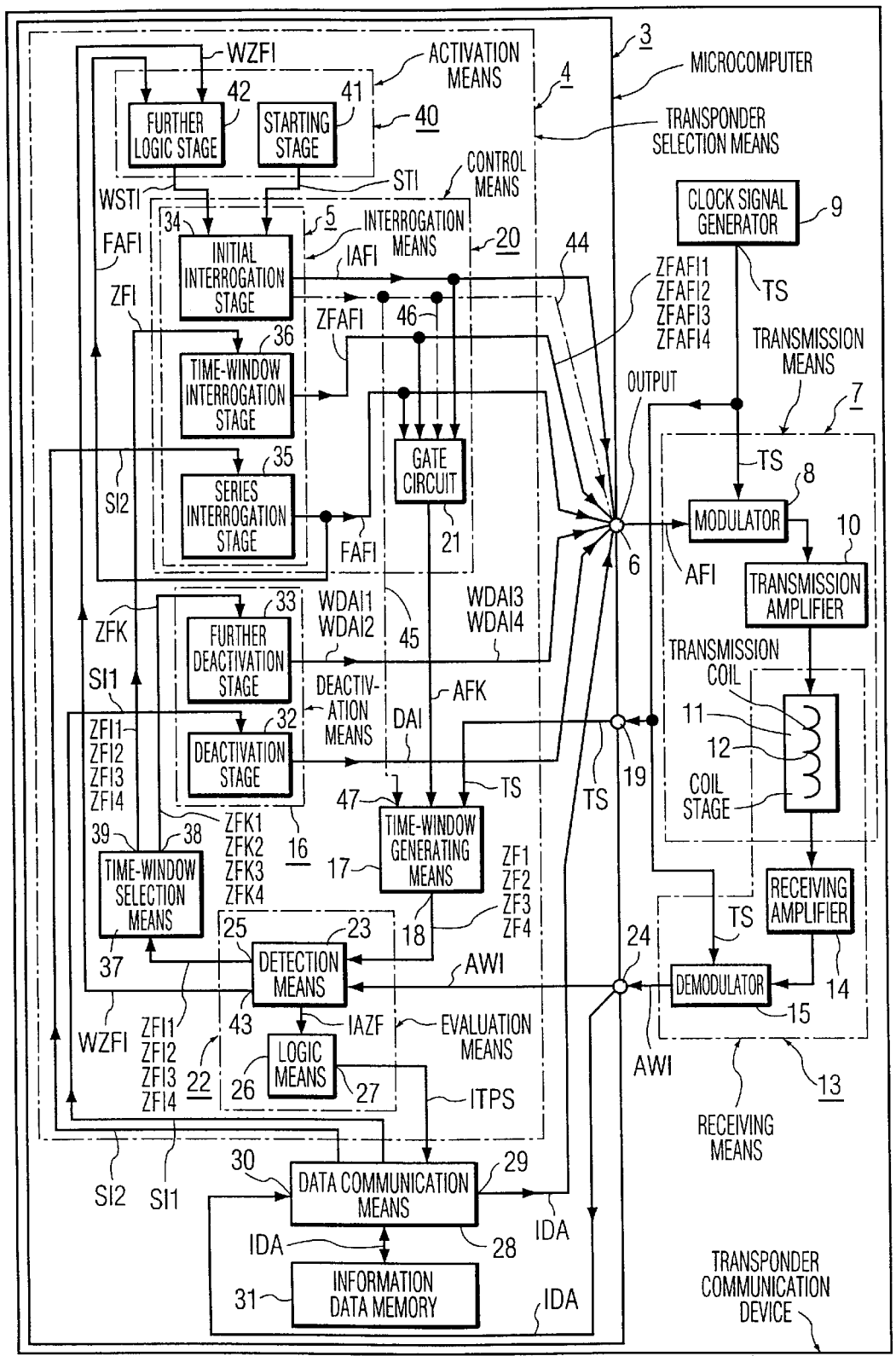
FIG. 1 diagrammatically shows a transponder communication device in accordance with a first embodiment of the invention including deactivation means for generating deactivation information to deactivate transponders and interrogation means for generating interrogation information to activate transponders and to interrogate transponders for the transmission of answer information.
Figure 2:
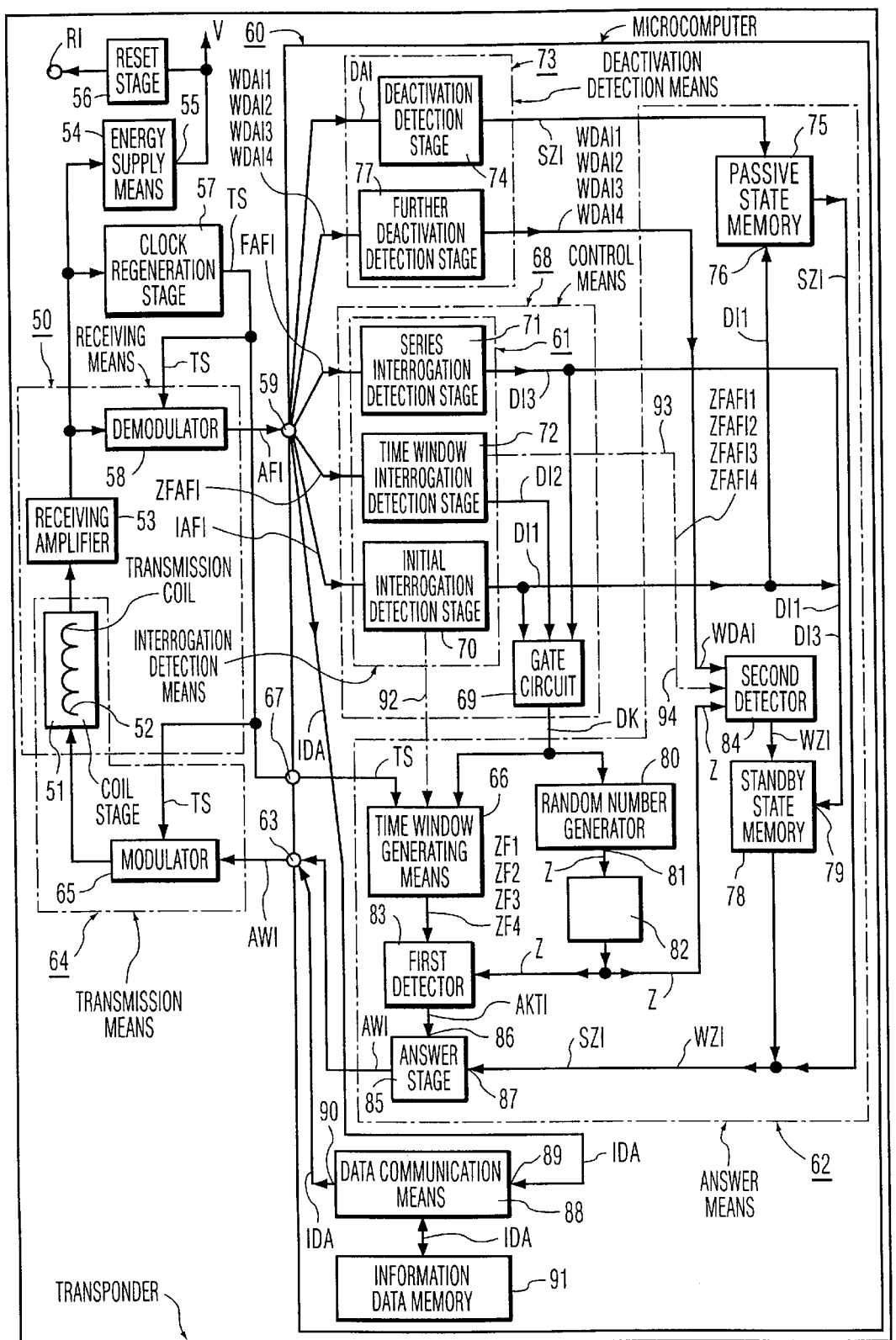
FIG. 2 shows a transponder in accordance with a first embodiment of the invention including deactivation means for deactivating the transponder and interrogation detection means for activating the transponders and interrogating the transponder for the transmission of answer information.

FIG. 1 shows a transponder communication device 1 adapted to provide contactless communication with at least one transponder 2. In the present case, the transponder communication device 1 is adapted to provide contactless communication with a plurality of individually selectable transponders 2, of which a transponder 2 is shown in FIG. 2. First of all, the construction of the transponder communication device 1 as shown in FIG. 1 will be described in more detail hereinafter.

The transponder communication device 1 includes a microcomputer 3 by means of which a plurality of means and functions are implemented, some of them being described in hereinafter. Hereafter, only those means and functions implemented by means of the microcomputer 3 which are relevant in the present context will be described in more detail.

With the aid of the microcomputer 3 transponder selection means 4 are realized, which selection means serve for the successive individual selection of transponders 2 present within a receiving range of the transponder communication device 1 and which are in an active state. The transponder selection means 4 include interrogation means 5 adapted to generate at least one item of interrogation information AFI by means of which transponders 2 present within a receiving range of the transponder communication device 1 and which are each in an active state can be requested to generate and transmit answer information AWI. The at least one type of interrogation information AFI generated by the interrogation means 5 can be applied to an output 6 of the microcomputer 3.

Interrogation information AFI generated by the interrogation means 5 can be applied from the output 6 to transmission means 7 provided and adapted to transmit the interrogation information AFI to transponders 2 present within the receiving range. The transmission means 7 include a modulator 8 constructed, in known manner, as a pulse-width modulator. However, the modulator can alternatively be a phase modulator or a frequency modulator. The modulator 8 is arranged to receive a clock signal TS, for whose generation the transponder communication device 1 includes a clock signal generator 9. Interrogation information AFI, which has been modulated by means of the modulator 8, can be applied to a transmission amplifier 10, which applies the amplified modulated interrogation information AFI to a coil stage 11, which includes a transmission coil 12, which in known manner cooperates inductively with a transmission coil in a transponder 2.

The transponder communication device 1 further includes receiving means 13 provided and adapted to receive answer information AWI generated and transmitted by transponders 2 present within the receiving range of the transponder communication device 1 in response to interrogation information AFI previously transmitted by the transponder communication device 1. The receiving means 13 also include the coil stage 11, which comprises the transmission coil 12 and by means of which answer information AWI transmitted by a transmission coil of a transponder 2 can be received in the receiving mode. Answer information AWI received by the transmission coil 12 can be applied to a receiving amplifier 14 of the receiving means 13. Modulated answer information amplified by the receiving amplifier 14 can be applied to a demodulator 15, which is for example a synchronous demodulator and is capable of demodulating the applied answer information, which is normally amplitude modulated. Similarly to the modulator 8, the demodulator can also receive the clock signal TS from the clock signal generator 9. When another transmission method is used another suitable demodulator may be provided.

The transponder selection means 4 realized by means of the microcomputer 3 further include deactivation means 16 by means of which a transponder 2 present within the receiving range of the transponder communication device 1 and which is in its active state can be set from its active state into a passive state after it has been selected, in which passive state the transponder 2 does not generate and transmit answer information AWI in response to at least one type of interrogation information AFI.

In the transponder communication device 1 the transponder selection means 4 advantageously also include time-window generating means 17 provided and adapted to generate a series F of K successive time windows ZF. In the present case the time-window generating means 17 are adapted to generate four time windows ZF 1, ZF 2, ZF 3 and ZF 4 in succession. On their output 18 the time-window generating means 17 produce signals, i.e. information, defining the four time windows ZF 1, ZF 2, ZF 3 and ZF 4. To generate the time windows ZF 1, ZF 2, ZF 3 and ZF 4 the clock signal TS from the clock signal generator 9 can be applied to the time-window generating means 17 via a first input 19 of the microcomputer 3. Furthermore, control means 20 for the time-window generating means 17 have been provided in order to control the generation of the time windows ZF 1, ZF 2, ZF 3 and ZF 4. Suitably, the control means 20 include the interrogation means 5 as well as a gate circuit 21, to which the interrogation information AFI that can be generated by the interrogation means 5 can be applied and which is adapted to generate and supply interrogation indedentification AFK. The interrogation identification AFK can be applied to the time-window generating means 17 in order to control said means. Thus, it is achieved that when the interrogation means 5 supply interrogation information the control means 20 control and activate the time-window generating means 17 so as to generate a series of K=4 time windows ZF. Moreover, it is thus achieved that by generating interrogation information AFI a number of times in succession the control means 20 cause the time-window generating means 17 to be controlled and activated a number of times in succession and consequently generate the series of K=4 time windows ZF a number of times in succession.

During each series of K=4 time windows ZF the receiving means 13 in the transponder communication device 1 can receive at least one item of answer information AWI in at least one time window ZF 1, ZF 2, ZF 3 or ZF 4, as will be set forth in more detail hereinafter.

In the transponder communication device 1 the selections means 4 advantageously also include evaluation means 13, which cooperate with the time-window generating means 17 and the receiving means 22, by means of which in dependence upon the occurrence of answer information AWI received from a transponder 2—and transmitted three times in succession—a transponder 2 can be selected in at least one time window ZF 1, ZF 2, ZF 3 or ZF 4 in each series F of the series of K=4 time windows ZF generated a number of times in succession, which will also be described in more detail hereinafter. The evaluation means 22 include detection means 23 arranged to receive, on the one hand, the signals or information defining the time windows ZF 1, ZF 2, ZF 3 and ZF 4 from the output 18 of the time-window generating means 17 and, on the other hand, the demodulated answer information AWI applied from the demodulator 15 of the receiving means 13 to a second input 24 of the microcomputer 3, which detection means generate one item of detection information of one of K=4 possible items of detection information—in dependence upon the occurrence of at least one type of answer information AWI received from a transponder in at least one time window ZF 1, ZF 2, ZF 3 or ZF 4 of a series of K=4 time windows ZF. In the present case time window information ZFI 1, ZFI 2, ZFI 3 or ZFI 4 of the K=4 items of time window information ZFI which are possible as detection information can be generated as detection information and can be supplied to an output of the detection means 23. By means of each of the K=4 items of time window information ZFI 1, ZFI 2, ZFI 3 or ZFI 4 a given $N_{th}$ time window ZF 1, ZF 2, ZF 3 or ZF 4 can be selected, as will be described in detail hereinafter. The interrogation means 5 can be controlled and activated by the detection means 23, as will also be described in more detail hereinafter. The evaluation means 22 further comprise logic means 26, to which the detection means 23 can supply information IAZF about the number of time windows ZF of each series of K=4 time windows ZF in which at least one item of answer information AWI has been received. Upon evaluation of the information IAZF detected by the detection means 23 in each series F of K=4 time windows ZF the logic means 26 can detect, for the selection of a transponder 2, that in M=3 successive series of K=4 time windows ZF answer information AWI has been received in each time only one time window ZF 1, ZF 2, ZF 3 or ZF 4. When the logic means 26 have detected that in M=3 successive series of K=4 time windows ZF answer information AWI has been received in each time only one time window ZF 1, ZF 2, ZF 3 or ZF 4, it is highly probable that the answer information each time received in a single time window ZF—which may each time be another time window ZF—always originates from the same transponder 2, i.e. that a transponder 2 of a plurality of transponders 2 has been selected individually. In this case, the logic means 26 generate information ITPS, which indicates that a transponder 2 has been selected. The logic means 26 supply the information ITPS to an output 27. It is to be noted that another value can be selected for M. For example, it is also possible that M=2. However, it is also possible that M=4, 5, 6, 7, 8, 9 or 10 and even higher. The selection accuracy increases as the value selected for M is greater.

In the transponder communication device 1 the evaluation means 22 cooperate with further means which, in the present case, are advantageously formed by data communication means 28, by means of which data communication with data communication means of the selected transponder 2 is possible in dependence upon the occurrence of received answer information AWI transmitted by only one transponder 2, i.e. after selection of a transponder 2. To effect such a data communication the data communication means 28 have an output 29 connected to the output 6 of the microcomputer 3, via which the information data IDA supplied by the data communication means 28 can be applied to the transmission means 7 in order to be transmitted. Information data IDA received by a transponder 2 can be applied from the receiving means 13 to an input 30 of the data communication means 28 via the second input 24 of the microcomputer 3. The data communication means 28 cooperate with an information data memory 31, into which information data IDA can be loaded with the aid of the data communication means 28 and from which the information data IDA can be read with the aid of the data communication means 28.

In the present case the data communication means 28 provided as further means are, in addition, adapted to generate first control information SI 1 in dependence on the occurrence of received answer information AWI transmitted by only one transponder 2, i.e. after selection of a transponder 2, which answer information is generated when data communication with the data communication means 28 has ceased, which information consequently indicates that data communication has been terminated.

The data communication means 28 provided as further means are further adapted to generate second control information SI 2 in dependence on the occurrence of received answer information AWI transmitted by only one transponder 2, i.e. after selection of a transponder 2, which answer information is generated when a previously selected transponder 2 has already been set to its passive state.

As regards the deactivation means 16 it is to be noted that the deactivation means 16 include a deactivation stage 32 to which the first control information SI 1 generated by the data communication means 28 can be applied and by means of which deactivation information DAI can be generated by means of which a selected transponder 2 present within the receiving range, which in its active state has already transmitted answer information AWI in response to interrogation information AFI, can be set from its active state to its passive state after its selection. The deactivation information can be formed by, for example, the data word "1000".

The deactivation means 16 further include a further deactivation stage 33 adapted to generate further deactivation information WDAI 1, WDAI 2, WDAI 3 and WDAI 4, by means of which further deactivation information WDAI 1, WDAI 2, WDAI 3 and WDAI 4 all the transponders 2 present within the receiving range, which in their active states have already transmitted answer information AWI in response to interrogation information AFI during a series F of K=4 time windows ZF, except for the given $N_{th}$ time window selected by means of time window information ZFI 1, ZFI 2, ZFI 3 or ZFI 4 generated by the detection means 23, can be set from their active states to a standby state, in which these transponders 2 do not generate and transmit answer information in response to time window interrogation information ZFAFI, which time window interrogation information will be referred to in more detail hereinafter. The further deactivation information WDMAI 1, WDAI 2, WDAI 3 and WDAI 4 can be formed by, for example, the data words "1001", "1010", "1011" and "1100".

As regards the interrogation means 5 of the transponder communication device 1 it is to be noted that the interrogation means 5 include an interrogation stage, which is referred to hereinafter as initial interrogation stage 34 and which is adapted to generate interrogation information, which is referred to hereinafter as initial interrogation information IAFI and with which all the transponders 2 present within the receiving range of the transponder communication device 1, some of which may have been set already to their passive states, can be set to their active states and, in addition, can be interrogated to again generate and transmit answer information AWI, if necessary, during a series F of K time windows ZF. The initial interrogation information IAFI can be formed, for example, by the data word "0000". The interrogation means 5 further include a further interrogation stage, which is referred to hereinafter as series interrogation stage 35, to which second control information SI 2 generated by the data communication means 28 can be applied and which is adapted to generate further interrogation information, which is referred to hereinafter as series interrogation information FAFI and with which all the transponders 2 present in the receiving range of the transponder communication device 1 and set to their standby states—except for the transponders 2 which have been set to their passive states after their selection—can be reset to their active states and can be interrogated to again generate and transmit answer information AWI during a further series F of K time windows ZF. The series interrogation information FAFI can be formed, for example, by the data word "0010".

The interrogation means 5 further include a further interrogation stage, which is referred to hereinafter as time window interrogation stage 36 and which is adapted to generate still further interrogation information, i.e. the time window interrogation information ZFAFI—already briefly referred to hereinbefore, which is generated by the detection means 23 when time window information ZFI 1, ZFI 2, ZFI 3 and ZFI 4 is supplied. By means of the time window interrogation information ZFAFI all the transponders 2 present within the receiving range and being in their active states, which transponders in their active states in which they have already transmitted answer information AWI in response to interrogation information in the given $N_{th}$ time window ZF 1, ZF 2, ZF 3 or ZF 4—selected by means of time window information ZFI 1, ZFI 2, ZFI 3 or ZFI 4 from a series F of K time windows ZF—, can each be interrogated without the active state being left to again generate and transmit answer information AWI during a further series F of K time windows ZF. The time window interrogation information ZFAFI can be formed, for example, by the data word "0001".

As regards the transponder selection means 4 of the transponder communication device 1 it is to be noted that in these selection means 4 time window selection means 37 are arranged between the detection means 23 and the interrogation means 5. Time window information ZFI 1, ZFI 2, ZFI 3 and ZFI 4 produced on the output 25 of the detection means 23 as detection information can be applied to the time window selection means 37. In conformity with the time window information ZFI 1, ZFI 2, ZFI 3 and ZFI 4 applied to the time window selection means 37 a given $N_{th}$ time window can be selected from the K time windows ZF of a series of K time windows ZF. The time window selection means 37 are adapted to generate time window identifications ZFK 1, ZFK 2, ZFK 3 and ZFK 4 in dependence on time window information ZFI 1, ZFI 2, ZFI 3 and ZFI 4 applied to them. The time window selection means 37 are constructed so as to generate the time window identifications ZFK 2, ZFK 3 and ZFK 4 when time window information ZFI 1 is applied, the time window identifications ZFK 1, ZFK 3 and ZFK 4 when time window information ZFI 2 is applied, the time window identifications ZFK 1, ZFK 2 and ZFK 4 when time window information ZFI 3 is applied, and the time window identifications ZFK 1, ZFK 2 and ZFK 3 when time window information ZFI 4 is applied. The generated time window identifications ZFK 1, ZFK 2, ZFK 3 and ZFK 4 are available on a first output 38 of the time window selection means 37.

The time window selection means 37 are further adapted to transfer the time window information ZFI 1, ZFI 2, ZFI 3 and ZFI 4 applied to them by the detection means 23 to the interrogation means 5, i.e. to the time window interrogation stage 36 of these means, in order to start the generation of the time window interrogation information ZFAFI after all the transponders 2 which can be set to their standby states by means of the further deactivation information WDAI 1, WDAI 2, WDAI 3 and WDAI 4 have been set to their active states. The time window information ZFI 1, ZFI 2, ZFI 3 and ZFI 4 is transferred by the time window selection means 37 via a second output 39 of the time window selection means 37.

It is to be noted that the transponder selection means 4 include activation means 40 included between the detection means 23 and the initial interrogation stage 34. The activation means 40 can activate a selection process in which an individual transponder 2 is selected from a number of transponders 2 present within the receiving range of the transponder communication device 1 in each of the successive selection steps of the activated selection process, the transponder 2 selected after each selection of a transponder being set to a passive state, when applicable after an identification process and a data exchange by means of this transponder.

In order to activate such a selection process the activation means 40 include a starting stage 41 by means of which starting information STI can be generated at given regular and constant time intervals, for example at time intervals in a range between 100 ms and 2 s. In addition, such a starting stage may also be controllable by externally applied separate control information so as to effect the generation of starting information. Generated starting information STI can be applied to the initial interrogation stage 34 which, in response to starting information STI applied to it, generates initial interrogation information IAFI and supplies this to the transmission means 7 via the output 6. The activation means 40 further include a further logic stage 42 by means of which further starting information WSTI can be generated, which can also be applied to the initial interrogation stage 34 of the interrogation means 5 to initiate the generation of the initial interrogation information IAFI. The further logic stage 42 of the activation means 40 is arranged to receive, one the one hand, series interrogation information FAFI from the series interrogation stage 36 and, on the other hand, further detection information, i.e. further time window information WZFI, produced by the detection means 23 on a further output 43 of the detection means 23. The further time window information WZFI is generated by the detection means 23 and transferred to the further output 43 when the detection means 23 detect an operational condition in which, after the supply of series interrogation information FAFI, no answer information AWI has been received in any time window ZF of the series F of K time windows generated in response to the previously supplied series interrogation information FAFI, which means that all the transponders 2 have already been selected individually in a selection process and that the selection process has thus been completed. In this case the two items of information applied to the further logic stage 42 of the activation means 40—i.e. the series interrogation information FAFI and the further time window information WZFI—cause the further logic stage 42 to supply the further starting information WSTI to the initial interrogation stage 34 of the interrogation means 5, as a result of which a new selection process with the necessary selection steps is started.

Based on the transponder communication device 1 shown in FIG. 1, a variant of such a transponder communication device forming a second embodiment is shown diagrammatically, in which the initial interrogation stage 34 is adapted to generate initial interrogation information IAFI by means of which it is also possible to define the number K of time windows ZFI, ZFI 2, ZFI 3 and ZFI 4 to ZFI K in the series F of K time windows ZF generated by the time-window generating means 17. As is indicated by means of three dash-dot lines 44, 45 and 46 in FIG. 1—the initial interrogation stage 34 supplies this initial interrogation information IAFI, on the one hand, to the transmission means 7 via the output 6 of the microcomputer 3 and, on the other hand to a control input 47 of the time-window generating means 17 and to the gate circuit 21. In the present case, the time-window generating means 17 are adapted to generate a series F of K time windows, the number K being defined by the initial interrogation information IAFI, which is achieved by applying the initial interrogation information IAFI to the time-window generating means 17 via the control input 44.

FIG. 2 shows a transponder 2 which is adapted to provide contactless communication with at least one transponder communication device 1 shown as a variant in FIG. 1 and which can be selected in an active state by means of a transponder communication device 1.

The transponder 2 comprises receiving means 50 adapted to receive at least one item of interrogation information AFI which can be generated and transmitted by a transponder communication device 1. The receiving means 50 include a coil stage 51 having a transmission coil 52. Interrogation information AFI received by the transmission coil 52 can be applied to a receiving amplifier 53. Information and data amplified by the receiving amplifier 53 can be applied to energy supply means 54, which derive energy from the received information or data signals, as a result of which a supply voltage V is produced on an output 55 of the energy supply means 54, which supply voltage can be used for the power supply of all the components of the transponder 2 which require a supply voltage. The output 55 of the energy supply means 54 is connected to a reset stage 56, which is capable of generating reset information RI when the voltage V derived by the energy supply means 54 is high enough. By means of the reset information RI those components of the transponder 2 which require this can be set to a well-defined operating condition. This is effected by means of measures which are known per se, for which reason this is not discussed any further in the present context.

Interrogation information AFI received by the receiving means 50 and other received data can be applied to a clock regeneration stage 57 by means of which a clock signal TS can be regenerated from the received interrogation information AFI or data, which clock signal can be supplied by the clock regeneration stage 57 and is in synchronism with the clock signal TS in the transponder communication device 1.

The receiving means 50 include a demodulator 58 formed by a pulse width demodulator. The demodulator can alternatively be a phase demodulator or a frequency demodulator. The regenerated clock signal TS can be applied to the demodulator 58. Interrogation information AFI or other data demodulated by means of the demodulator 58 can be applied to a first input 59 of a microcomputer 60 of the transponder 2. By means of the microcomputer 60 a multitude of means and functions are realized, only some of them being described in more detail hereinafter.

The microcomputer 60 forms interrogation detection means 61 of the transponder 2 for detecting at least one received item of interrogation information AFI. The microcomputer 60 further forms answer means 62 which are controllable by the interrogation detection means 61 and which are provided and adapted to generate answer information AWI in response to received interrogation information AFI detected by the interrogation detection means 61. Answer information AWI generated by the answer means 62 can be supplied to an output 63 of the microcomputer 60 and can be supplied from this output 63 to transmission means 64 of the transponder 2.

The transmission means 64 are provided and adapted to transmit answer information AWI generated by the answer means 62. The transmission means 64 include a modulator 65, which is also arranged to receive the regenerated clock signal TS and by means of which a load modulation of the clock signal TS, applied to the transmission coil 12 of a transponder communication device 1 in unmodulated form, can be effected in dependence upon answer information AWI and on other data applied to this modulator via the transmission coil 52 of the transponder 2 and a transmission coil 12 of a transponder communication device 1, which coils are inductively coupled to one another, so that by means of this load modulation data is transmitted from the transponder 2 to a transponder communication device 1.

In the transponder 2 the answer means 62 now advantageously include time-window generating means 66 provided and adapted to generate a series F of K successive time windows ZF. The regenerated clock signal TS can be applied to the time-window generating means 66 via a second input 67 of the microcomputer 60. In the present case, the time-window generating means 66 are adapted to generate and supply a series F of K=4 successive time windows ZF 1, ZF 2, ZF 3 and ZF 4. Each time window ZF is defined by a given condition or signal waveform. For example, the beginning of a time window ZF can be defined by a positive edge of a rectangular signal and the end of a time window ZF by a negative edge of this rectangular signal. It is likewise possible to define the beginning of a time window ZF by a positive edge of a rectangular signal and the end of this time window ZF by the beginning of the next time window ZF, i.e. by a subsequent positive edge of this rectangular signal. It is obvious that this also applies to the time-window generating means 17 of the transponder communication device 1 as shown in FIG. 1.

The answer means 62 further include control means 68 for the time-window generating means 66. The control means 68 can control and activate the time-window generating means 66 so as to generate the series F of K time windows ZF a number of times in succession. The control means 68 for the time-window generating means 66 advantageously include the interrogation detection means 61. Furthermore, the control means 68 are implemented in such a manner that upon reception of interrogation information AFI by the interrogation detection means 61 the control means 68 control and activate the time-window generating means 66 so as to generate a series F of K time windows ZF. For this purpose, the control means 68 include a gate circuit 69 arranged to receive on its three inputs detection information DI 1, DI 2 and DI 3 generated and supplied by the interrogation detection means, which gate circuit can generate a detection identification DK upon reception of this detection information DI 1, DI 2 and DI 3, which detection identification can be applied to the time-window generating means 66 and causes the time-window generating means 66 to be activated.

The interrogation detection means 61 included in the control means 68 for the time-window generating means 66 comprise an interrogation detection stage, hereinafter referred to as initial interrogation detection stage 70 and adapted to detect initial interrogation information IAFI transmitted by a transponder communication device 1 in order to set the transponder 2 to its active state, by means of which detection stage the transponder 2 can be set from its passive state to its active state and, moreover, can be interrogated to again generate and transmit answer information AWI, if required, which will be described in more detail hereinafter. The initial interrogation detection stage 70 is adapted to generate and supply the first detection information DI 1.

The interrogation detection means 61 included in the control means 68 for the time-window generating means 66 further comprise a further interrogation detection stage, hereinafter referred to as series interrogation detection stage 71 and adapted to detect series interrogation information FAFI transmitted by a transponder communication device 1, by means of which detection stage the transponder 2, which is in its standby state, can be set from its standby state to its active state, which will be described in more detail hereinafter. The series interrogation detection stage 71 is adapted to generate and supply the third detection information DI 3.

The interrogation detection means 61 included in the control means 68 for the time-window generating means 66 further comprise a further interrogation detection stage, hereinafter referred to as time window interrogation detection stage 72 and adapted to detect time window interrogation information ZFAFI transmitted by a transponder communication device 1, by means of which detection stage the transponder 2, which is in its active state, can be interrogated without the active state being left to generate and transmit answer information AWI during a series F of K time windows ZF, i.e. also to again generate and transmit answer information AWI during a further series F of K time windows ZF, which will be described in more detail hereinafter. The time window interrogation detection stage 72 is adapted to generate and supply the second detection information DI 2.

The microcomputer 60 of the transponder 2 further forms deactivation detection means 73 adapted to detect at least one item of detection deactivation information DAI transmitted by a transponder communication device 1. The deactivation detection means 73 are adapted to generate at least one item of state information by means of which the transponder 2 can be made to leave its active state and the generation of answer information AWI by the answer means 62 can be inhibited.

The deactivation detection means 63 include a deactivation detection stage 74 adapted to detect deactivation information DAI transmitted by a transponder communication device 1 to set the transponder 2 from its active state to its passive state, which stage can set the transponder 2 from its active state to its passive state and can generate passive state information SZI. Alternatively, the passive state information SZI can be formed directly by the detected deactivation information DAI. The generated passive state information SZI can be applied to the answer means 62, i.e. to a passive state memory 75 of the answer means 62, in which memory the passive state information SZI can be stored and by means of which the transponder 2 can be held in its passive state. The fact that the transponder 2 is in its passive state is stored in the transponder 2 for as long as the passive state memory 75 stores the passive state information SZI. The passive state memory 75 can be erased by the interrogation detection means 61 upon detection of given interrogation information, i.e. the passive state memory 75 can be erased by means of the initial interrogation detection stage 70 of the interrogation detection means 61 after detection of initial interrogation information IAFI. For this purpose, the first detection information DI 1 generated and supplied by the initial interrogation detection stage 70 is applied to an erase input 76 of the passive state memory 75 and, when it appears on the erase input 76 of the passive state memory 75, it causes the content of the passive state memory 75 to be erased.

The deactivation detection means 73 further include a further deactivation detection stage 77 adapted to detect further deactivation information WDAI 1, WDAI 2, WDAI 3 and WDAI 4 transmitted by a transponder communication device 1 to set the transponder from its active state to its standby state, which stage enables the transponder 2 to be set from its active state to its standby state and the generation of standby state information WZI to be started. The generation of the standby state information WZI will be described in more detail hereinafter. The generated standby state information WZI can be applied to a standby state memory 78, in which the standby state information WZI can be stored and by means of which the transponder can be held in its standby state. The standby state memory 78 can be erased by the interrogation detection means 61 upon detection of given interrogation information. In the present case the standby state memory 78 can be erased both by means of the initial interrogation detection stage 70 of the interrogation detection means 61 and by means of the series interrogation detection stage 71 of the interrogation detection means 61. For this purpose, the first detection information DI 1, which can be generated and supplied by the initial interrogation detection stage 70, and the third detection information DI 3, which can be generated and supplied by the series interrogation detection stage 71, can be applied to an erase input 79 of the standby state memory 78. When they appear on the erase input 79 of the standby state memory 78 the detection information DI 1 as well as the detection information DI 3 cause the content of the standby state memory 78 to be erased.

In the transponder 2 the answer means 62 realized by means of the microcomputer 60 advantageously include a random number generator 80. Similarly to the time-window generating means 66, the random number generator 80 can be activated by the control means 68 in that the detection identification DK generated by the gate circuit 69 is also applied to the random number generator 80. The random number generator 80 enables a random number Z ranging from 1 to K to be generated and to be supplied to an output 81 of the random number generator 80. By means of each random number, generated at random by the random number generator 80, it is possible to select and define a time window ZF of a series F of K time windows ZF. The random number Z stored each time in the random number memory 82 can be applied to two detectors 83 and 84. The first detector 83 is constructed in such a manner that it can detect that the window number N of a time window ZF of a series F of K time windows ZF corresponds to the random number Z. In the case that the window number N of a time window ZF corresponds to the random number Z the first detector 83 generates activation information AKTI, which can be applied to an activation input 86 of an answer stage 85.

The answer stage 85 can generate answer information AWI, for example, formed by the data word "1111". Answer information AWI generated by means of the answer stage 85 can be applied to the output 63 of the microcomputer 60 and from this output to the transmission means 64 of the transponder 2, so that the answer information AWI can be transmitted or sent to a transponder communication device 1 by the afore-mentioned load modulation by the modulator 65. The answer stage 85 includes an inhibit input 87, to which the passive state information SZI stored in the passive state memory 75 and the standby state information WZI stored in the standby state memory 78, or control information derived from the information SZI and WZI, can be applied to block the answer stage 85 when the transponder 2 is in the passive state or in the standby state and thus inhibit the generation of answer information AWI.

As already stated hereinbefore, the first detector 83 compares the time window number N with the instantaneous random number Z and, in the case of equality, supplies the activation information AKTI in order to activate the answer stage 85. This means that the answer stage 85 is only active during a time window ZF defined by the random number Z. Thus, the answer means 62 are adapted to generate answer information AWI in a time window ZF 1, ZF 2, ZF 3 or ZF 4, i.e. in a time window F of a series F of K time windows ZF defined by the random number Z.

As stated, the random number Z stored in the random number memory 82 can also be applied to the second detector 84. The second detector 84 is further arranged to receive the further deactivation information WDAI 1, WDAI 2, WDAI 3 and WDAI 4 detected by means of the further deactivation detection stage 77. The second detector 84 is adapted to detect that the number N of the further deactivation information WDAI 1, WDAI 2, WDAI 3 or WDAI 4 corresponds to the random number Z read from the random number memory 82. When the number N of the further deactivation information WDAI 1, WDAI 2, WDAI 3 or WDAI 4 corresponds to the random number Z the second detector 84 generates the afore-mentioned standby state information WZI and supplies the standby state information WZI to the standby state memory 78, which then stores the standby state information WZI. The fact that the transponder 2 is in its standby state is stored in the transponder 2 for as long as the standby state memory 78 stores the standby state information WZI.

With regard to the transponder 2 it is to be noted that the transponder 2 includes data communication means 88 realized by means of the microcomputer 60, which means have their input 89 connected to the first input 59 of the microcomputer 60 and, via this first input 59, to the receiving means 50 and have their output 90 connected to the output 63 of the microcomputer 60 and, via this output 63, to the transmission means 64. The data communication means 88 of the transponder 2 cooperate with an information data memory 91, into which information data IDA can be written with the aid of the data communication means 88 and from which information data IDA can be read with the aid of the data communication means 88.

Based on the transponder 2 shown in FIG. 2, a variant of such a transponder forming a second embodiment is shown diagrammatically, in which the initial interrogation detection stage 70 is adapted to detect initial interrogation information IAFI by means of which it is also possible to define the number K of time windows ZF in the series F of K time windows ZF generated by the time-window generating means 66 and in which the time-window generating means 66 are adapted to generate a series F of K time windows ZF, in which the number K can be defined by the initial information detection stage 70 in dependence upon the detected initial interrogation information IAFI. In such a transponder 2—as is indicated diagrammatically by means of a dash-dot line 92 in FIG. 2—the initial interrogation information IAFI, which is detected by the initial interrogation detection stage 70 and which has been transmitted by a corresponding transponder communication device 1, is applied to a control input 69 of the time-window generating means 66 and in this way the number K of time windows ZF for each generated series F of K time windows ZF is defined.

Hereinafter, a selection process is described which involves a transponder communication device 1 as shown in FIG. 1 and, by way of assumption, five transponders 2 as shown in FIG. 2, which transponders 2 are identified hereinafter as TP 1, TP 2, TP 3, TP 4 and TP 5. The selection process is described with reference not only to Figures and 2 but also to FIGS. 3A to 3L.

The selection process is started, for example, automatically in that the starting stage 41 of the activation means 40 of the transponder communication device 1, which starting stage 41 supplies starting information STI at given regular time intervals, supplies starting information STI to the initial interrogation stage 34. The initial interrogation stage 34 subsequently generates the initial interrogation information IAFI and supplies this to its output, as is shown diagrammatically in FIG. 3A. The initial interrogation information IAFI, which is supplied by the initial interrogation stage 34 and which initiates a first selection step of the activated selection process, is applied to the gate circuit 21 of the control means 20 for the time-window generating means 17. In response to this, the gate circuit 21 supplies the interrogation identification AFK to the time-window generating means 17. Furthermore, the generated initial interrogation information IAFI is applied to the transmission means 7, which transmit it to all five transponders TP 1 to TP 5 present within the receiving range of the transponder communication device 1. The initial interrogation information IAFI applied to all five transponders TP 1 to TP 5 by the transmission means 7 is received by the receiving means 50 in all five transponders TP 1 to TP 5 and is each time applied to the first input 59 of the microcomputer 60 and from this input each time to the initial interrogation detection stage 70. Each initial interrogation detection stage 70 subsequently detects the initial interrogation information IAFI applied to it and supplies the first detection information DI 1. The first detection information DI 1 is applied both to the erase input 76 of the passive state memory 75 and to the erase input 79 of the standby state memory 78, so that both any passive state information SZI stored in the passive state memory 75 and any standby state information WZI stored in the standby state memory 78 are erased. This means that both a possibly stored passive state and a possibly stored standby state of a transponder are erased and, consequently, all five transponders TP 1 to TP 5 are set to their active states. The first detection information DI 1 is further applied to the gate circuit 69 of the control means 68, which subsequently supplies the detection identification DK, which is applied to the time-window generating means 66 and the random number generator 80.

The construction of the gate circuit 21 of the transponder communication device 1 and the construction of the gate circuits 69 of all the transponders TP 1 to TP 5 are adapted to one another in such a manner that the interrogation identification AFK generated by the gate circuit 21 and the detection identification DK generated by the gate circuit 69 ensure a synchronous starting of the time-window generating means 17 of the transponder communication device 1 and of the time-window generating means 66 of all the transponders TP 1 to TP 5. The synchronous starting of the time-window generating means 17 in the transponder communication device 1 and of the time-window generating means 66 in all the transponders TP 1 to TP 5 can, for example, be effected at an instant T 2 in FIG. 3B after a given number of pulses of the clock signal TS after the termination of the generation of the initial interrogation information IAFI at an instant T 1 in FIG. 3A. After the synchronous starting of the time-window generating means 17 and 66 at the instant T 2 the synchronously started time-window generating means 17 and 66 each generate a first series F of K=4 time windows ZF 1, ZF 2, ZF 3 and ZF 4, as is shown diagrammatically in FIG. 3B.

As already stated, the gate circuit 69 in each of the transponders TP 1 to TP 5 situated within the receiving range of the transponder communication device 1 generates the detection identification DK and supplies it to the relevant random number generator 80. Subsequently, each random number generator 80 of the transponders TP 1 to TP 5 situated within the receiving range of the transponder communication device 1 generates a random number Z which ranges between 1 and 4 in conformity with the number K of time windows ZF. It is now assumed that the two random number generators 80 of the two transponders TP 1 and TP 5 each happen to generate the number Z=1. It is also assumed that the random number generator 80 of the transponder TP 3 generates the random number Z=2. Moreover, it is assumed that the two random number generators 80 of the two transponders TP 2 and TP 4 each generate the random number Z=4.

In each of the five transponders TP 1 to TP 5 situated within the receiving range of the transponder communication device 1 the generated random number Z is stored in the random number memory 82. Furthermore, the stored random number Z in each of the five transponders TP 1 to TP 5 is applied to the first detector 83, which compares the applied random number Z with the numbers N ("1", "2", "3", "4") of the successively generated time windows ZF 1, ZF 2, ZF 3 and ZF 4 of the first series F 1 of K=4 time windows ZF. In the case of equality of a time window number N and the random number Z each of the first detectors 83 of the five transponders TP 1, TP 2, TP 3, TP 4 and TP 5 supplies activation information AKTI to the activation input 86 of the answer stage 85 of the respective transponder 2. Since both the passive state memory 75 and the standby state memory 78—as explained hereinbefore—have been erased, the answer stage 85 will receive neither the passive state information SZI nor the standby state information WZI at its inhibit input 87, as a result of which the answer stage 85 is enabled to generate answer information AWI. As soon as the number N of a time window ZF corresponds to the random number Z, the answer stage 85 supplies answer information AWI.

Figure 3A:
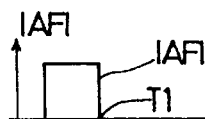
FIGS. 3A to 3L diagrammatically show time diagrams of information and time windows occurring in the transponder communication device shown in FIG. 1 and in the transponder shown in FIG. 2.
Figure 3B:
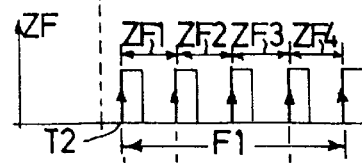
Figure 3C:
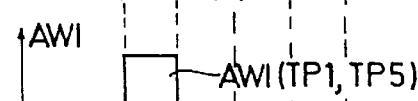
Figure 3D:
Figure 3E:
Figure 3F:
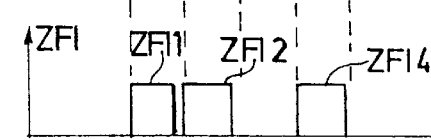
Figure 3G:
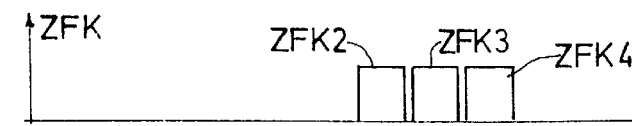

In accordance with the above example that the two transponders TP 1 and TP 5 each generate the random number Z=1, the transponder TP 3 generates the random number Z=2, and the two transponders TP 2 and TP 4 each generate the random number Z=4, this results in answer information AWI being generated in each of the answer stages 85 of the two transponders TP 1 and TP 5 during the first time window ZF 1 of the first series F 1, as is shown diagrammatically in FIG. 3C, in answer information AWI being generated in the answer stage 85 of the transponders TP 3 during the second time window ZF 2 of the first series F 1, as is shown diagrammatically in FIG. 3D, and in answer information AWI being generated in each of the answer stages 85 of the two transponders TP 2 and TP 4 during the fourth time window ZF 4 of the series F 1, as is shown diagrammatically in FIG. 3E.

The answer information AWI generated in a transponder TP is transmitted to the receiving means 13 of the transponder communication device 1 by the transmission means 64 of each transponder TP. Since random number Z generated in each case is stored in each random number memory 82 of the five transponders TP 1 to TP 5, information which indicates in which time window ZF of the first series F 1 the relevant transponder TP has generated answer information AWI and transmitted this information to the transponder communication device 1 is available in each of these five transponders TP 1 to TP 5.

After it has been received by the receiving means 13 and has then been demodulated by the demodulator 15 the answer information AWI in accordance with FIGS. 3C, 3D and 3E, transmitted to the transponder communication device 1 by the five transponders TP 1 to TP 5, is applied to the second input 24 of the microcomputer 3 and then to the detection means 23 of the evaluation means 22. Furthermore, the time windows ZF 1, ZF 2, ZF 3 and ZF 4 of the first series F 1 of K=4 time windows ZF generated by the time-window generating means 17 and available on the output 18 of the time-window generating means 17 are applied to the detection means 23.

The detection means 23 now detect in which of the four time windows ZF 1, ZF 2, ZF 3 and ZF 4 of the first series F 1 answer information AWI has been received. In the present example the detection means 23 detect that answer information AWI has been received in the first time window ZF 1 and the second time window ZF 2 as well as in the fourth time window ZF 4 of the first series F 1. In conformity with this detection result the detection means 23 produce detection information in the form of time window information on their output 25, i.e. first time window information ZFI 1, second time window information ZFI 2 and fourth time window information ZFI 4, as is shown diagrammatically in FIG. 3F. These three items of time window information ZFI 1, ZFI 2 and ZFI 4 are applied to the time window selection means 37.

The time window selection means 37 now select a given $N_{th}$ time window ZF of the first series F 1 in accordance with the applied time window information ZFI 1, ZFI 2 and ZFI 4. It is assumed that time window selection means 37 select the first time window ZF 1 of the first series F 1 as the given $N_{th}$ time window ZF. In conformity with this choice by the time window selection means 37 the selection means 37 generate three time window identifications, whose numbers differ from the number N=1 of the selected first time window ZF 1. This means that in the present case, in which the time window selection means 37 have selected the first time window ZF 1 of the first series F 1, the time window selection means 37 generate a second time window identification ZFK 2, a third time window identification ZFK 3 and a fourth time window identification ZFK 4 and supply this to their first output 38, as is shown diagrammatically in FIG. 3G. The three time window identifications ZFK 2, ZFK 3 and ZFK 4 are applied to the further deactivation stage 33, which in response to this generates second further deactivation information WDAI 2, third further deactivation information WDAI 3 and fourth further deactivation information WDAI 4, as is shown diagrammatically in FIG. 3H. The further deactivation information WDAI 2, WDAI 3 and WDAI 4 is transferred to the output 6 of the microcomputer 3 and is applied to the transmission means 7 via this output 6. As a result of this, the further deactivation information WDAI 2, WDAI 3 and WDAI 4 is transmitted to the five transponders TP 1, TP 2, TP 3, TP 4 and TP 5 situated within the receiving range of the transponder communication device 1.

Figure 3H:
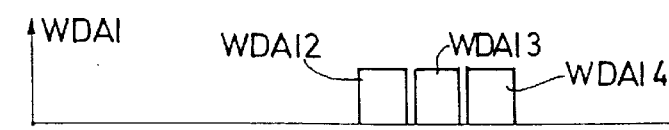

In the five transponders TP 1 to TP 5 the further deactivation information WDAI 2, WDAI 3 and WDAI 4 is applied to the further deactivation detection stage 77. Each further deactivation detection stage 77 of the five transponders TP 1 to TP 5 detects the applied further deactivation information WDAI 2, WDAI 3 and WDAI 4 as shown in FIG. 3H and supplies the further deactivation information WDAI 2, WDAI 3 and WDAI 4 to the second detector 84. In the second detectors 84 of the five transponders TP 1 to TP 5 the three numbers N of the further deactivation information WDAI 2, WDAI 3 and WDAI 4 are compared with the random number Z stored in each random number memory 82. When a number of the further deactivation information WDAI corresponds to the stored random number Z, this results in the standby state information WZI being supplied.

In the present case, in which it has been assumed that the random number Z=1 has been stored in the random number memories 82 of the two transponders TP 1 and TP 5 and the second, the third and the fourth further deactivation information WDAI 2, WDAI 3 and WDAI 4, i.e. the further deactivation information WDAI bearing the numbers N=2, 3, 4, are applied to the second detectors 84 of these two transponders TP 1 and TP 5, these two detectors 84 do not detect correspondence of any one of the three numbers N of the further deactivation information WDAI with the stored random number Z, as a result of which these two detectors 84 do not supply standby state information WZI and, consequently, no standby state information WZI is stored in the standby state memory 78 of the two transponders TP 1 and TP 5, which means that the two transponders TP 1 and TP 5 are in their active states. Conversely, in the transponder TP 3 the comparison of the random number Z=2 stored in its random number memory 82 with the numbers N=2, 3, 4 of the second, the third and the fourth further deactivation information WDAI 2, WDA 3 and WDAI 4 applied to the second detector 84 reveals that the random number Z=2 corresponds to the number N=2 of the second further deactivation information WDAI 2, as a result of which the second detector 84 of the transponder TP 3 supplies standby state information WZI to the standby state memory 78 and the transponder TP 3 is consequently set to its standby state in which its answer stage 85 is blocked via the inhibit input 87. Likewise, the second detector 84 in each of the two transponders TP 2 and TP 4 detects that the random number Z=4 stored in the random number memory 82 of each of the two transponders TP 2 and TP 4 corresponds to the number N=4 of the fourth further deactivation information WDAI 4 applied to each second detector 84, so that these two transponders TP 2 and TP 4 are set to their standby states.

It is to be noted that owing to the fact that the detection means 23 have detected that no answer information AWI has been received in the third time window ZF 3 of the first series F 1, the transfer of the third time window information ZFI 3 to the output 24 of the detection means 23 can also be inhibited, as a result of which it is possible that the time window selection means 37 do not generate the third time window identification ZFK 3 and, consequently, the generation of the third further deactivation information WDAI 3 by the further deactivation stage 33 does not take place.

Figure 3I:
Figure 3J:
Figure 3K:
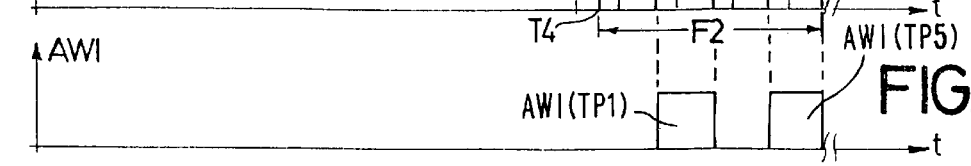
Figure 3L:

After the transponders TP 2, TP 3 and TP 4 have thus been set to their standby states, the time window selection means 37 supply the first time window information ZFI 1 selected by them from their second output 39 to the first time window interrogation stage 36, as a result of which the time window interrogation stage 36 generates and supplies the time window interrogation information ZFAFI, as is shown diagrammatically in FIG. 3I. The time window interrogation information ZFAFI is applied to the gate circuit 21 and, after it has been transmitted by means of the transponder communication device 1 and after it has been received by the two transponders TP 1 and TP 5, which have been left in their active states, it is applied to the gate circuits 69 of these two transponders TP 1 and TP 5, as a result of which, in the same way as explained hereinbefore, the time-window generating means 17 of the transponder communication device 1 are activated and the time-window generating means 66 of the two transponders TP 1 and TP 5, which have been left in their active states, are activated. When it is assumed that the time window interrogation information ZFAFI as shown in FIG. 3I is terminated at an instant T 3, this again results in the synchronous activation of the time-window generating means 17 and 66 and, consequently, the generation of a second series F 2 of K=4 time windows ZF 1, ZF 2, ZF 3 and ZF 4, the second series F 2 starting at an instant T 4, as is shown diagrammatically in FIG. 3J.

The gate circuits 69 of the two transponders TP 1 and TP 5 further re-activate the random number generator 80, as a result of which the two random number generators 80 each again generate a random number Z. It is assumed that the random number generator 80 of the transponder TP 1 generates the random number Z=2 and the random number generator 80 of the transponder TP 5 generates the random number Z=4. Consequently, in a manner similar to that described hereinbefore, the answer stage 85 of the transponder TP 1 generates answer information AWI during the second time window ZF 2 of the second series F 2 and the answer stage 85 of the transponder TP 5 generates answer information AWI during the fourth time window ZF 4 of the second series F 2, as is shown diagrammatically in FIG. 3K. The respective answer information AWI is transmitted to the transponder communication device 1.

Subsequently, the detection means 23 in the transponder communication device 1 detect, in a manner similar to that already described hereinbefore, that answer information AWI has been received in the second time window ZF 2 and in the fourth time window ZF 4 of the second series F of K=4 time windows. After this, the detection means 23 supply the second and the fourth time window information ZFI 2 and ZFI 4 to the time window selection means 37 in conformity with the detection result. The time window selection means 37 now again select a time window ZF. It is assumed that the time window selection means 37 select the second time window ZF 2 of the second series F 2. As a result of this, the time window selection means 37 first of all produce the first, the third and the fourth time window identification ZFK 1, ZFK 3 and ZFK 4 on their first output 38, so that the further deactivation stage 33 generates the first, the third and the fourth further deactivation information WDAI 1, WDAI 3 and WDAI 4, which causes the transponder TP 5, which has supplied answer information AWI in the fourth time window ZF 4 of the second series F 2, to be set to its standby state, after which the time window selection means 37 transfer the second time window information ZFI 2 to their second output 39, which leads to a re-activation of the time window interrogation stage 36, causing it to supply the time window interrogation information ZFAFI, as a result of which a new series of K time windows, i.e. a third series F 3 of K time windows, is generated.

After the generation of the third series F 3 of K time windows the transponder TP 1 answer information AWI is received only from the transponder TP 1 in a single time window ZF of the third series F 3 because now only the transponder TP 1 is in its active state. It is assumed that the random number generator 80 of the transponder TP 1 has generated the random number Z=3, as a result of which answer information AWI is transmitted and received in the third time window ZF 3 of the third series F 3, as is shown diagrammatically in FIG. 3L. This is detected by the detection means 23, upon which the detection means 23 now generate the third time window information ZFI 3 corresponding to the third time window ZF 3, in which answer information AWI has been received from the transponder TP 1, and supply it to the time window selection means 37. Subsequently, the time window selection means 37 generate the first, the second, and the fourth time window identification ZFK 1, ZFK 2 and ZFK 4, so that accordingly the first, the second and the fourth further deactivation information WDAI 1, WDAI 2 and WDAI 4 are generated and, consequently, the transponder TP 1 is not set to its standby state because it has previously transmitted answer information AWI in the third time window ZF 3.

Subsequently, the time window selection means 37 transfer the third time window information ZFI 3, which is the only time window information ZFI now, to the time window interrogation stage 36 via its second output 39, as a result of which a new series F, i.e. a fourth series F 4 of K=4 time windows ZF, is generated. After this, the transponder TP 1, which is still in its active state, again derives answer information AWI, so that the detection means 23 again detect that now answer information has been received in only one time window, i.e. in the present example the second time window ZF 2 of the fourth series F 4.

After this, as already explained, a further series F, i.e. a fifth series F 5 of K=4 time windows ZF is generated. In principle, this generation of further series F 6, F 7, F 8 etc. of K time windows ZF may be continued but it is more appropriate to interrupt this in due time, as will be explained hereinafter.

When the detection means 23 have detected a number of times that answer information AI has been received in only one time window ZF, this is a reliable indication that now only a single transponder TP in an active state is present within the receiving range of the transponder communication device 1, that a transponder TP has been selected.

As explained hereinbefore, the detection means 23 detect for each series F 1, F 2, F 3, F 4 etc. of K time windows ZF in which time windows ZF at least one item of answer information AWI has been received. Thus, there is always information IAZF available in the detection means 23, which indicates in how many time windows ZF a series F of K time windows with at least one item of answer information AW has been received. This information IAZF about the number of time windows ZF in which answer information AWI has been received, is each time applied to the logic means 25. As soon as the logic means 25 detect that answer information AWI has been received in each time only one time window ZF in M=3 successive series F of K time windows ZF, the logic means 25 produce information ITPS on their output 26 to indicate that a transponder TP has been selected. In the present case, it indicates that the transponder TP 1 has been selected.

After selection of the transponder TP 1 the data communication means 28 are activated with the aid of the information ITPS to enable a data communication with the data communication means 88 of the transponder TP 1. During this data communication it is possible, for example, first of all to check an identity code of the transponder TP 1 and, subsequently, to proceed with data communication for the purpose of exchanging or transmitting information data IDA.

After completion of this data communication the data communication means 28 first of all supply the first control information SI 1, which is applied to the deactivation stage 32. Subsequently, the deactivation stage 32 generates the deactivation information DAI, which is transmitted to the transponder TP 1 and is detected by means of the deactivation detection stage 74 in the transponder TP 1. As a result of this, the deactivation detection stage 74 generates the passive state information SZI and supplies it to the passive state memory 75, causing to the transponder TP 1 to be set to its passive state and held in this state by means of the passive state memory 75. This completes the first selection step of the activated selection process.

Subsequently, the data communication means 28 supply the second control information SI 2, which is applied to the series interrogation stage 36. After this, the series interrogation stage 36 generates the series interrogation information FAFI, by means of which a second selection step of the activated selection process is initiated. The series interrogation information FAFI is applied to the gate circuit 21 of the transponder communication device 1 and to the transmission means 7 of the transponder communication device 1. The transmission means 7 transmit the series interrogation information FAFI to all the transponders 2 present within the receiving range of the transponder communication device 1. However, since the transponder TP 1 is in its passive state as a result of the deactivation effected in the first selection step, the transponder TP 1 cannot respond to the series interrogation information FAFI and consequently remains in its passive state. Conversely, the other transponders TP 2, TP 3, TP 4 and TP 5, which are situated within the receiving range of the transponder communication device 1 in the present example and which have been set to their standby states in the preceding first selection step of the activated selection process, can be set from their standby states to their active states by means of the series interrogation information FAFI transmitted by the transponder communication device 1. This is possible in that the transmitted series interrogation information FAFI is detected by the series interrogation detection stage 71 of each of the four transponders TP 2 to TP 5, as a result of which the series interrogation detection stage 71 supplies the third detection information DI 3 to the erase input 79 of the standby state memory 78, which causes the standby state memory 78 to be erased and, consequently, each of the four transponders TP 2 to TP 5 to be set from their standby states to their active states. Furthermore, the third detection information DI 3 is applied to the gate circuit 69 of each of the four transponders TP 2 to TP 5.

Depending on the series interrogation information FAFI which is applied to the gate circuit 21 of the transponder communication device 1 and which initiates the second selection step and depending on the third detection information DI 3 applied to the gate circuit 69 of each of the four transponders TP 2 to TP 5, the time-window generating means 17 and the time-window generating means 66 are subsequently started in synchronism with one another in a manner similar to that already described hereinbefore, so that again a first series F 1 of K=4 time windows ZF is generated at the beginning of the second selection step of the activated selection process. Now a further transponder TP is selected individually with the aid of the transponders TP 2, TP 3, TP 4 and TP 5. After data communication between the transponder selected in the second selection step and the transponder communication device 1 has been completed this transponder is also set to its passive state. It is now assumed that this is the transponder TP 5 selected in the second selection step.

Subsequently, a third selection step is activated by means of the newly generated series interrogation information FAFI, in which step a following transponder is selected and then set to its passive state with the aid of the three remaining transponders TP 2, TP 3 and TP 4. It is now assumed that this is the transponder TP 3 selected in the third selection step.

In a subsequent fourth selection step one of the two remaining transponders TP 2 and TP 4 to be selected is selected and then set to its passive state. It is now assumed that this is the transponder TP 4 selected in the fourth selection step.

Finally, in a subsequently activated fifth selection step the remaining transponder TP 2 to be selected yet is selected and finally set to its passive state.

After the five selection steps described above have been carried out all five transponders TP 1, TP 2, TP 3, TP 4 and TP 5 have been set to their passive states, as a result of which in a subsequent sixth selection step activated by means of the series interrogation information FAFI none of the five transponders TP 1 to TP 5 transmits answer information to the transponder communication device 1. This is detected by the detection means 23, after which the detection 23 produce means the further time window information WZSFI on its output 43, which information indicates that no answer information has been received and is applied to the further logic stage 42 of the activation means 40. As already stated hereinbefore, the series interrogation information FAFI, by means of which the sixth selection step has been initiated and which has been generated by the series interrogation stage 35, is also applied to the further logic stage 42. Upon reception of said information WZFI and FAFI the further logic stage 42 generates the further starting information WSTI, as a result of which the initial interrogation stage 34 is re-activated, which causes a new selection process to be activated.

As is apparent from the preceding description, a transponder communication device 1 in accordance with the invention and transponders 2 in accordance with the invention guarantee a very rapid and reliable individual selection of each time one transponder 2. This is because a selection process only has to allow for the transponders 2 present within the receiving range of a transponder communication device 1 and a rapid elimination of transponders 2 in large numbers is achieved owing to the allocation of a plurality of time windows ZF to the transponders 2 present in the receiving range, as a result of which a transponder 2 can be selected with only a few selection steps and, consequently, much time is saved. Another advantage to be mentioned is that for the sake of reliability the provisionally eliminated but not yet selected transponders 2 are set to a standby state during each selection step of a selection process, so that they cannot disturb the continued selection step and after selection of a transponder can be reset very simply from their standby states to their active states for the purpose of subsequently selecting a further transponder. A further advantage to be mentioned is that each transponder selected in a selection step of a selection process is set to a passive state after its selection, so that it can be disregarded and cannot have any adverse effect during the following selection steps of a selection process.

In a variant of the transponder communication device 1 shown in FIG. 1 the further deactivation stage may be dispensed with, in which case the time window selection means select time window information ZFI from all the time window information ZFI 1, ZFI 2, ZFI 3 and ZFI 4 which can be generated and supplied as detection information by the detection means and applies said information to the time window interrogation stage 36, which is then adapted to generate and supply four items of time window information ZFAFI 1, ZFAFI 2, ZFAFI 3 and ZFAFI 4, which can be transmitted to transponders which are variants of the transponder 2 shown in FIG. 2 and which are suitable for processing these four items of time window interrogation information ZFAFI. In comparison with the transponder 2 shown in FIG. 2 each of these transponders then does not comprise a further deactivation stage but includes a time window information detection stage 72 adapted to detect and supply the four items of time window interrogation information ZFAFI, the detected and supplied time window interrogation information ZFAFI, instead of the further deactivation information WDAI, then being applied to a second detector 84, as is indicated diagrammatically by the dash-dot lines 93 and 94 in FIG. 2. In the present case, the second detector 84 is constructed to compare the number N of the applied time window interrogation information ZFAFI N with the random number Z from the random number memory 82 and in the case of inequality it generates standby state information WZI and supplies this to standby state memory 78, so that all the transponders 2 which have not transmitted any answer information AWI in the $N_{th}$ time window ZF N corresponding to the time window interrogation information ZFAFI N are set to their standby states.

In the modified transponder communication device described briefly in the preceding paragraph the further deactivation stage is formed by the time window interrogation stage. In the modified transponder described briefly in the preceding paragraph the further deactivation detection stage is formed by the time window detection stage.

The invention is not limited to the variants described hereinbefore. The transponder variants described herein are so-called passive transponders in which the required energy is derived from the received data signals. Obviously, the invention can also be used advantageously in so-called active transponders having an independent power supply, for example batteries or solar cells. As is the case with the variants described herein, the communication in both communication directions between a transponder communication device and each transponder can be effected inductively, the communication frequency in both communication directions, which is essentially determined by the frequency of the clock signal, being approximately 125 kHz. However, within the scope of the invention it is also possible to effect the communication in one communication direction of a transponder communication device to any transponder inductively with a communication frequency of approximately 125 kHz but to effect the communication in the other communication direction with a UHF radio system having a communication frequency in the range of 433 MHz.

What is claimed is:

1. A transponder communication device for contactless communication with at least one transponder, said transponder communication device comprising:

interrogation means for generating at least one item of interrogation information by means of which a transponder present within a receiving range of the transponder communication device which is in an active state is interrogatable to generate and transmit answer information;

transmission means for transmitting the at least one item of interrogation information to a transponder present within the receiving range;

receiving means for receiving answer information generated and transmitted by a transponder present within the receiving range in response to the at least one item of interrogation information; and deactivation means for generating at least one item of deactivation information by means of which a transponder present within the receiving range and which is in its active state is settable to a state in which the transponder does not generate and transmit answer information in response to the at least one item of interrogation information, the deactivation means comprising a deactivation stage for generating deactivation information by means of which a transponder present within the receiving range, which transponder has already transmitted answer information in response to interrogation information in its active state, subsequently settable from its active state to a passive state, the deactivation means comprising a further deactivation stage for generating at least one item of further deactivation information by means of which a transponder present within the receiving range, which transponder has already transmitted answer information in response to interrogation information in its active state, subsequently settable from its active state to a standby state, the interrogation means comprising an interrogation stage for generating interrogation information by means of which a transponder present within the receiving range is settable from its passive state to its active state and, in addition, is interrogatable, when necessary, to again generate and transmit answer information, the interrogation means further comprising a further interrogation stage for generating further interrogation information by means of which a transponder present within the receiving range is settable from its standby state to its active state and, in addition, is interrogatable to again generate and transmit answer information, and the interrogation means still further comprising a still further interrogation stage for generating at least one item of further interrogation information by means of which a transponder within the receiving range, which transponder has already transmitted answer information in response to interrogation information in its active state, is interrogatable to again generate and transmit answer information without leaving the active state.

2. A transponder communication device as claimed in claim 1, comprising evaluation means which cooperate with the receiving means, which evaluation means comprise detection means for generating and supplying at least one item of detection information depending on the occurrence of at least one received item of answer information transmitted by a transponder, and the further deactivation stage of the deactivation means is activatable, depending on the occurrence of detection information, to generate at least one item of further deactivation information.

3. A transponder communication device as claimed in claim 1, comprising evaluation means which cooperate with the receiving means, which evaluation means comprise detection means for generating and supplying at least one item of detection information depending on the occurrence of at least one received item of answer information transmitted by a transponder, and the still further interrogation stage of the interrogation means is activatable, depending on the occurrence of detection information, to generate at least one item of still further interrogation information.

4. A transponder communication device as claimed in claim 2, wherein selection means cooperate with the evaluation means, and detection information supplied by the evaluation means is applicable to the selection means, and the further deactivation stage is activatable by the selection means, in conformity with detection information applied to said selection means, to generate at least one item of further deactivation information.

5. A transponder communication device as claimed in claim 2, wherein the evaluation means cooperate with further means for generating first control information in dependence upon the occurrence of received answer information transmitted by only one transponder, and the first control information generated by the further means is applicable to the deactivation stage to generate the deactivation information.

6. A transponder communication device as claimed in claim 2, wherein the detection means detect an operational situation in which the receiving means have not received any answer information transmitted by a transponder, and the detection means generate and supply further detection information upon detection of the operational situation, and the interrogation stage is activatable to generate the interrogation information in dependence upon the occurrence of the further detection information.

7. A transponder for contactless communication with a transponder communication device and which, in an active state, is activated to communicate with the transponder communication device, said transponder comprising:
   receiving means for receiving at least one item of interrogation information transmitted by the transponder communication device;
   interrogation detection means for detecting at least one item of received interrogation information;
   answer means controllable by the interrogation detection means to generate answer information in response to received interrogation information detected by the interrogation detection means;
   transmission means for transmitting the answer information generated by the answer means; and
   deactivation means by means of which the transponder is settable to a state in which the transponder does not generate and transmit answer information in response to interrogation information,
   the deactivation detection means comprising a deactivation detection stage for detecting deactivation information transmitted by the transponder communication device, by means of which the transponder, which in its active state has already transmitted answer information in response to interrogation information, is subsequently settable from its active state to a passive state, the deactivation detection means further comprising a further deactivation detection stage for detecting further deactivation information transmitted by the transponder communication device, by means of which the transponder, which in its active state has already transmitted answer information in response to interrogation information, is subsequently settable from its active state to a standby state,
   the interrogation detection means comprising an interrogation detection stage for detecting interrogation information transmitted by the transponder communication device, by means of which the transponder is settable from its passive state to its active state and, in addition, is interrogatable to again generate and transmit answer information, if necessary, the interrogation detection means further comprising a further interrogation detection stage for detecting further interrogation information transmitted by the transponder communication device, by means of which the transponder is settable from its standby state to its active state and, in addition, is interrogatable to again generate and transmit answer information, and the interrogation detection means still further comprise a still further interrogation detection stage for detecting still further interrogation information transmitted by the transponder communication device, by means of which the transponder, which in its active state has already transmitted.answer information in response to interrogation information, is interrogatable to again generate and transmit answer information without leaving the active state.

8. A transponder as claimed in claim 7, wherein the deactivation detection stage generates and transmits passive state information after detection of deactivation information, and by means of the passive state information the transponder is settable from its active state to its passive state, and the transponder comprising a passive state memory in which the passive state information is storable and by means of which the transponder is holdable in its passive state.

9. A transponder as claimed in claim 7, wherein the further deactivation detection stage cooperates with means for generating and transmitting passive state information, which means is activatable by the further deactivation detection stage and is configured to set the transponder from its active state to its standby state, and the transponder comprising a passive state information memory in which the passive state information is storable and by means of which the transponder is holdable in its standby state.

10. A transponder as claimed in claim 7, wherein the further deactivation detection stage is constituted by the still further interrogation detection stage, and the still further interrogation detection stage cooperates with means for generating and supplying standby state information, the means for generating and supplying standby information being configured to activate the still further deactivation detection stage and with the the further interrogation detection stage the transponder being settable from its active state to its standby state, and the transponder comprising a standby state memory in which the standby state information is storable and the transponder being holdable in its standby state by means of the stored standby state information.

11. A transponder communication device comprising:
   an interrogation signal generator for generating an interrogation signal;
   a transmitter for transmitting said interrogation signal to a plurality of transponders, said plurality of transponders each comprising an interrogation signal detector, an answer signal generator for generating an answer signal in response to a detected interrogation signal, and a state setting controller for setting a state; and
   a receiver for receiving said answer signal,
   said transponder communication device being configured to select a single transponder of said plurality of transponders by transmitting of an initial interrogation signal to said plurality of transponders when being in an active state, and by, in dependence of received answer signals from said plurality of transponders in response to said initial interrogation signal, at least once transmitting of a standby state setting signal to at least one transponder of said plurality of transponders at a time so as to instruct transponders for which said standby state setting signal is intended to adopt a standby state for being standby for interrogation after selection of said single transponder, said single transponder having been selected after all other transponders of said plurality of transponders have been eliminated by adopting said standby state.

12. A transponder communication device as claimed in claim 11, wherein said transponder communication device is configured to instruct said selected single transponder to adopt a passive state by transmitting a passive state setting signal to said selected single transponder, said passive state being maintained until said all other transponders have been selected thereafter.

13. A transponder communication device as claimed in claim 12, wherein said transponder communication device is configured to instruct said all other transponders to adopt an active state from said standby state by transmitting an active state setting signal to said all other transponders, prior to selecting another single transponder of said all other transponders.

14. A transponder communication device as claimed in claim 11, wherein said interrogation signal generator comprises a time window generator for synchronously generating time windows to interrogate said plurality of transponders and to receive answer signals from said plurality of transponders, said time windows being generated each time upon transmitting said standby state setting signal, until selection of said single transponder.

15. A transponder comprising:

an interrogation signal detector for detecting an interrogation signal generated by and received from a transponder communication device that selects a single transponder of a plurality of transponders including said transponder by transmitting an initial interrogation signal to said plurality of transponders when being in an active state;

an answer signal generator for generating an answer signal in response to a detected interrogation signal; and a state setting controller for setting a state, said state setting controller setting said transponder into a standby state when receiving a standby state setting signal from said transponder communication device so as to eliminate said transponder from selection until selection of said single transponder, and setting said transponder into said active state, after said single transponder has been selected, when receiving an active state setting signal from said transponder communication device so as to re-instate said transponder for selection.

16. A transponder as claimed in claim 15, wherein, after selection of said transponder, said transponder is instructed to adopt a passive state when receiving a passive state setting signal from said transponder communication device, said passive state being maintained until said all other transponders of said plurality of transponders have been selected.

17. A transponder as claimed in claim 15, wherein said interrogation signal detector comprises a time window detector for synchronously detecting time windows generated by said transponder communication device, said time windows being intended for interrogating said plurality of transponders, and said transponder comprising an answer signal generator for randomly generating an answer signal in one of said time windows.

\* \* \* \* \*